(12) United States Patent
Herberger et al.

(10) Patent No.: US 9,176,575 B2
(45) Date of Patent: Nov. 3, 2015

(54) SYSTEM AND METHOD FOR UTILIZING GEO LOCATION DATA FOR THE GENERATION OF LOCATION-BASED TRANSITIONS IN A MULTIMEDIA WORK

(75) Inventors: Tilman Herberger, Dresden (DE); Titus Tost, Dresden (DE)

(73) Assignee: MAGIX, AG (DE)

( * ) Notice: Subject to any disclaimer, the term of this patent is extended or adjusted under 35 U.S.C. 154(b) by 744 days.

(21) Appl. No.: 13/474,458

(22) Filed: May 17, 2012

(65) Prior Publication Data

US 2013/0132841 A1     May 23, 2013

Related U.S. Application Data

(60) Provisional application No. 61/488,532, filed on May 20, 2011.

(51) Int. Cl.
| | |
|---|---|
| *G06F 3/00* | (2006.01) |
| *G06F 3/048* | (2013.01) |
| *G06F 3/01* | (2006.01) |
| *G11B 27/034* | (2006.01) |
| *G11B 27/30* | (2006.01) |

(52) U.S. Cl.
CPC ............. *G06F 3/01* (2013.01); *G11B 27/034* (2013.01); *G11B 27/3027* (2013.01)

(58) Field of Classification Search
CPC ...................................... G11B 27/034
USPC ................... 715/719, 723, 200, 726
See application file for complete search history.

(56) References Cited

U.S. PATENT DOCUMENTS

| | | | | |
|---|---|---|---|---|
| 7,236,960 | B2 * | 6/2007 | Manico et al. ............... | 705/500 |
| 7,362,946 | B1 * | 4/2008 | Kowald ........................ | 386/278 |
| 8,750,684 | B2 * | 6/2014 | Sproule et al. ............... | 386/278 |
| 2009/0282336 | A1 * | 11/2009 | Lindley et al. ............... | 715/716 |

* cited by examiner

*Primary Examiner* — Manglesh M Patel
(74) *Attorney, Agent, or Firm* — Fellers, Snider, Blankenship, Bailey & Tippens, P.C.; Terry L. Watt

(57) ABSTRACT

According to a preferred aspect of the instant invention, there is provided a system and method that allows the user to automatically utilize the embedded location data of digital image files in the production of a multimedia work. The system allows the user to select a transition from among a plurality of provided transitions, wherein the embedded location data of a selected digital image file is then used to adapt the selected transition to a location-based transition, which is then subsequently inserted into the multimedia work.

11 Claims, 3 Drawing Sheets

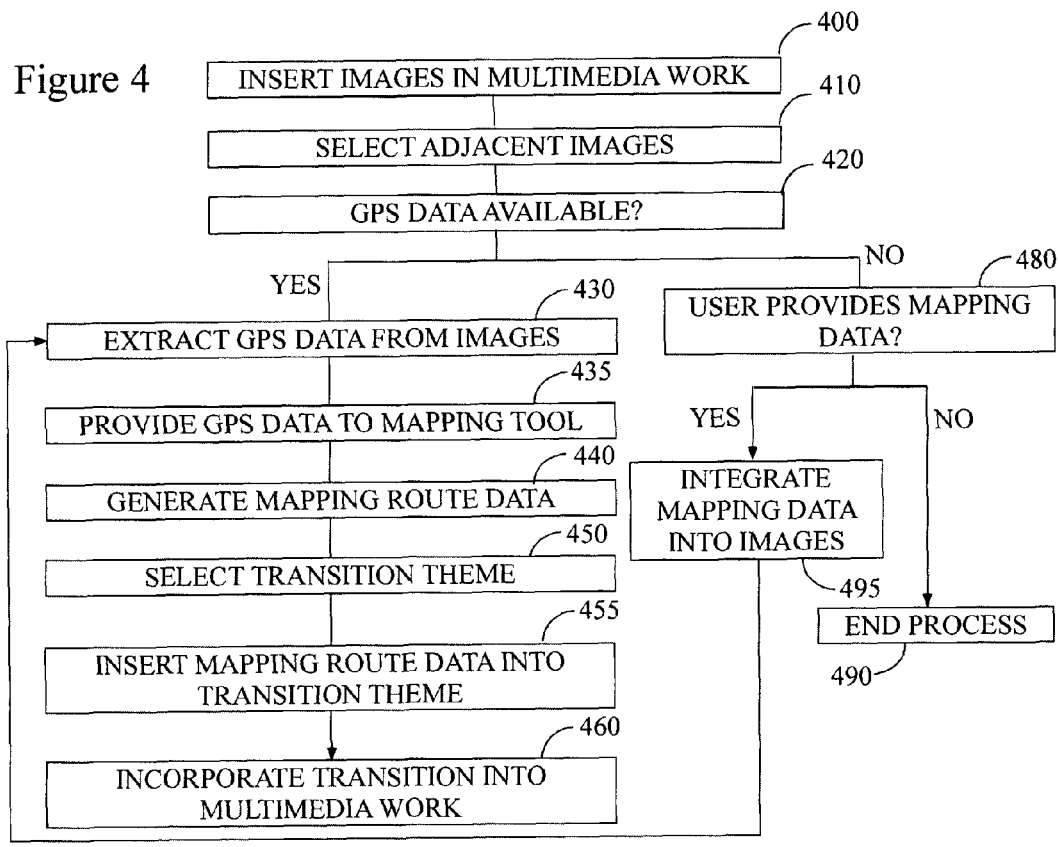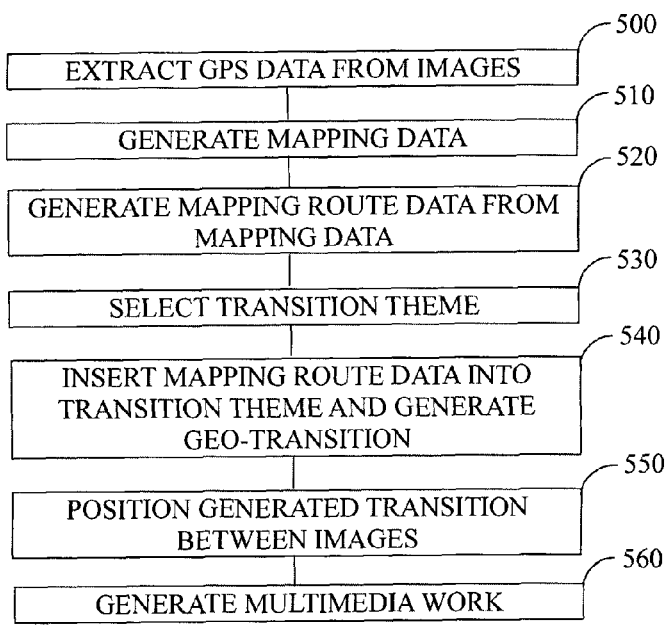

SYSTEM AND METHOD FOR UTILIZING GEO LOCATION DATA FOR THE GENERATION OF LOCATION-BASED TRANSITIONS IN A MULTIMEDIA WORK

This application claims the benefit of U.S. Provisional Patent Application Ser. No. 61/488,532 filed on May 20, 2011 and incorporates said provisional application by reference into this document as if fully set out at this point.

FIELD OF THE INVENTION

The present invention relates generally to the field of multimedia creation and editing.

BACKGROUND

In recent years digital photo devices have begun a technological revolution that will carry forward for many years to come. One recent trend is the incorporation of GPS capable receivers into the photo devices. GPS chip sets that are onboard the camera make it possible for these devices to automatically embed location data into the metadata of images. Online photo and other websites have quickly adapted to utilize this location information and have made it possible to generate interactive photomaps that display the locations where each photo was taken.

However, the multimedia editing software that is used by most users does not utilize the embedded location data in the editing process. In some cases, the user might be able to access and display (e.g., on a map) the embedded location data, but little use is otherwise made of this information.

Thus, what is needed is a system and method that allows a user to utilize the embedded data in his or her digital photos when editing and creating a multimedia work. The system and method will provide the user with an efficient, simple and quick way to utilize the embedded location data to generate location based transitions between individual digital photo images.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for utilizing photo, video, and, more generally, multimedia geo location data for the generation of location-based transitions in a multimedia work. Note that the geo location data will preferably be embedded into the metadata of each digital media item at the time that it is acquired. However, in some preferred arrangements the user will manually insert or assign geo locations for one or all of the media items that make up the multimedia work.

In a preferred embodiment, the instant invention will provide the user with a number of selectable transition themes and styles from within the multimedia editing application. In some embodiments, these themes and styles will represent specially designed transitions that will incorporate the geo location data by for example featuring movement from one location on a virtual map to another location.

In a preferred arrangement, a user will import digital photos (or other images, video, audio, etc.) into multimedia editing software. The imported digital media images will then be sorted and provided to the user for selection. The user will then select a plurality of digital images for insertion into the multimedia work. After the digital images or other media items have been inserted, the instant invention will extract or otherwise determine the geo location data associated with each and will prompt the user for selection of a location-based transition theme. After the selection of a predefined transition template the instant invention will preferably automatically generate a location-based transition that is to be inserted between two adjacent digital media items, i.e., a geo-transition. The way that the selected transition will be implemented will depend at least in part on the embedded metadata of the two media items. After generation of the location-based transition, the user will be able to integrate the transition into the multimedia work.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 4 shows a general workflow suitable for use with the instant invention.

FIG. 5 illustrates a high level representation of a workflow suitable for use with the instant invention.

DESCRIPTION OF THE PREFERRED EMBODIMENTS

Figure 1:
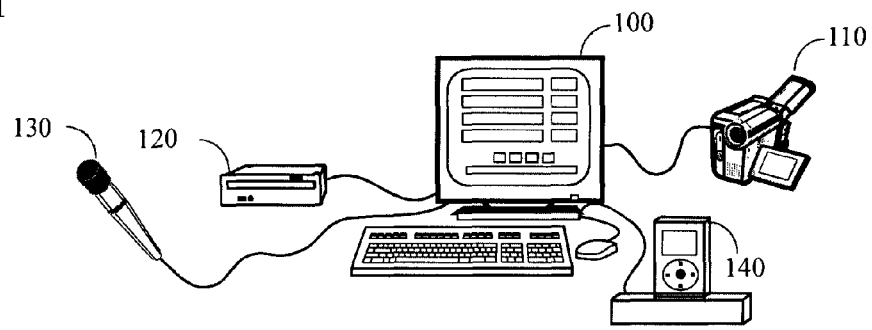
FIG. 1 depicts a general working environment suitable for use with the instant invention.

Referring now to the drawings, wherein like reference numerals indicate the same parts throughout the several views, there is provided a preferred system and method for utilizing geo location data for the generation of location-based transitions in a multimedia work.

As is generally indicated in FIG. 1, at least a portion of the instant invention will be implemented in form of software running on a user's computer 100. Such a computer will have a display device (e.g., an LCD or video computer monitor), some amount of program memory, and access to hard disc storage (whether internal or accessible via a network) as is conventionally utilized by such units. Additionally it is possible that an external camera 110 of some sort might be utilized with—and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally a microphone 130 might be utilized so that the user can add voice-over narration to a multimedia work or can control his or her computer via voice-recognition software and additionally a CD or DVD burner 120 could be useful for storing content on writable or rewritable media.

Turning now to a discussion of the instant invention, note that, for purposes of specificity in the disclosure that follows, the discussion will be framed in terms of transitions generated from "images" that have location data associated therewith. However, it should be noted and remembered that transitions between video clips containing location data could readily be performed by, for example, using the last frame of one clip and the first frame of the next. In a first embodiment, the instant invention will preferably supplement, support and/or enhance the well-known procedures that are traditionally used when editing and working with digital material like photos and videos. The instant invention will preferably operate as an adjunct to the editing options typically offered by multimedia editing software. The instant invention is intended to provide the user with an ability to generate location-based transitions, preferably through the use of geo location data that has previously been embedded in or separately provided with the digital photo or other material. The concept will allow the user to work according to his or her preferred workflow when editing multimedia material, but provides the additional functionality of using existing data to add another layer of information to the multimedia work and furthermore to provide more options when creating a compelling multimedia work. For purposes of the instant disclosure, when the term "multimedia work" is used herein, that term should be understood to refer to a work that contains some combination of digital still images and videos that are intended to be viewed as a unified work. An accompanying audio track may or may not be a part of the multimedia work.

Figure 2:
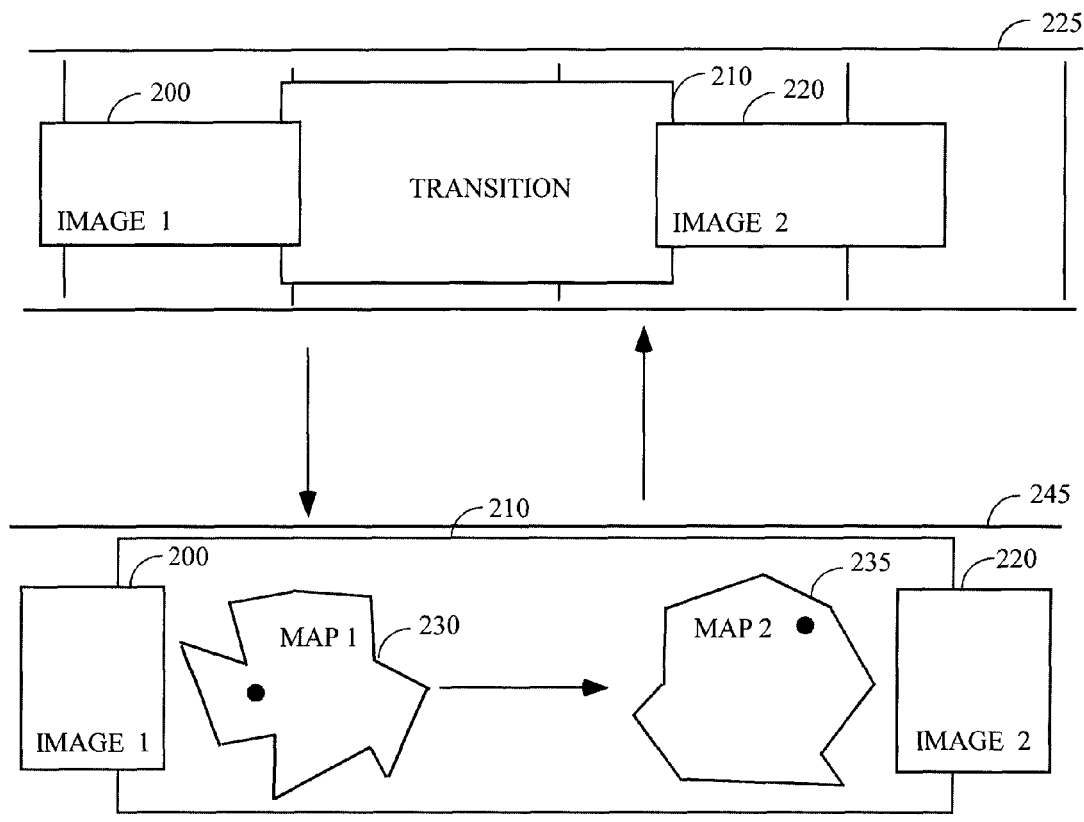
FIG. 2 illustrates an embodiment of a graphical user interface of the instant invention which utilizes both a general and a close up look.

Turning next to FIG. 2, this figure illustrates a section of a preferred graphical user interface of the instant invention. This section of the graphical user interface contains the building blocks for the transition, wherein FIG. 2 provides both a general 225 and a zoomed or expanded 245 view of the same section as it is preferably presented to the user. In a preferred embodiment the user will have already selected and imported at least two digital image or other files into the multimedia editing software. In this embodiment, both digital image files 200, 220 have metadata embedded within that contains GPS or other location data (e.g., latitude and longitude, "X" and "Y" coordinates, etc.). In this embodiment the graphical user interface will automatically add a placeholder transition object 210 between the adjacent digital images 200 and 220, the place holder object 210 representing a digital image transition that will be selected and created according to the instant invention. Next, and preferably, the user will chose a theme for the transition from among a number of available themes that might be provided by the software developer and which will be discussed in greater detail below. In the zoomed view 245 the instant invention is depicted as having already utilized the location data stored in (or associated with) each file and filled a selected transition template with the location data, after which a location-based transition is generated according to the methods set out below. In this particular example, the user has opted for a transition theme that utilizes two maps, with the two maps showing the individual locations of both adjacent digital files. In this case, the transition will comprise and visually provide simulated movement from Map 1 230 to Map 2 235. Those of ordinary skill in the art will understand that the location data that is discussed herein might be stored within the EXIF (i.e., exchangeable image file format) or other data area associated with the multimedia item. Of course, the location data might also be stored in a file that is separate from the image, video, etc. However, in a preferred arrangement the location data will have been previously made a part of the multimedia item itself.

Figure 3:
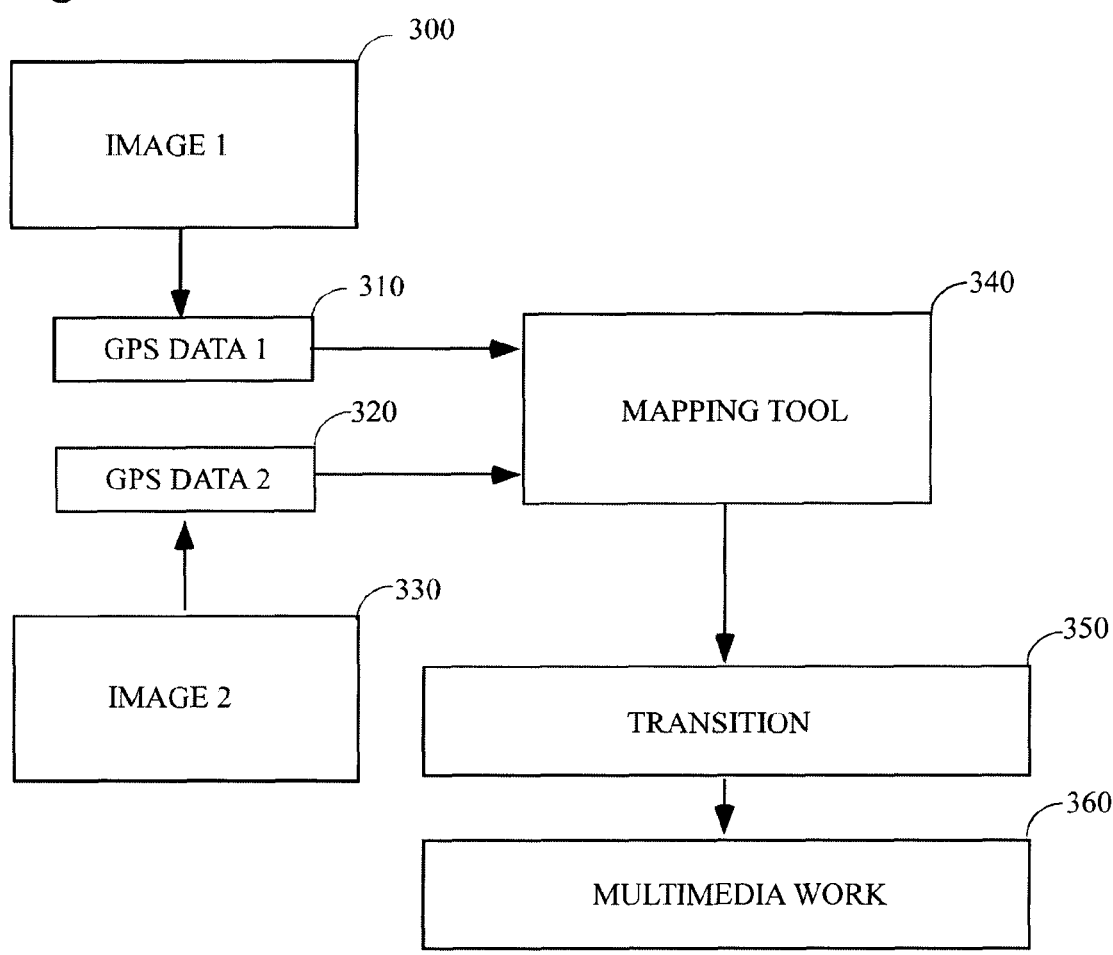
FIG. 3 depicts a high level summary of one version of the components employed by the instant invention.

Turning now to FIG. 3, this figure illustrates some components of the instant invention and provides a high level view of the interaction and data flow between these components. Image 1 300 and Image 2 330 are digital image files that are preferably positioned adjacent to each other in the time line of the graphical user interface of the multimedia editing software. The instant invention will preferably extract the GPS or other location data associated with each image from its metadata, thereby producing two data packets 310, 320 that will contain the location data of each digital image file. These data packets will then be transferred to a mapping tool 340, which will preferably be a part of the multimedia editing software, wherein the data packets are transformed for insertion into a selected transition 350. After the insertion of that data, the location-based transition will be generated and inserted into the multimedia work 360.

Coming next to FIG. 4, this Figure contains a more detailed workflow suitable for use with the instant invention. In a first preferred step the user will select and insert digital image files into a multimedia work in a multimedia editing software 400. In a next preferred step at least two adjacent digital image files will be selected 410. Of course, multiple images could be selected and, in such a case, the instant program could process the images by selecting adjacent pairs in the timeline or create a single smooth transition from the first to the last image through each of the intermediate images, etc. In the next preferred step the instant invention will determine if GPS or other location data is available in the selected digital image files 420. If that is not the case the instant invention will prompt the user to provide the mapping data 480. If the user is not able to provide a location associated with the image, the process of the instant invention will end 490. However, if the user is able to provide location data, in one embodiment the instant invention will associate (e.g., integrate the data into the file) the data with the digital image files 495 and will provide the digital image files to the next step of the instant invention, wherein the GPS data, the location data will be extracted from the digital image files 430. In a next preferred step, the extracted GPS data will be provided to a mapping tool 435. Based on the locations of the beginning and ending images, the mapping tool will then generate mapping route data to be used in the transition. That is, in this embodiment the mapping tool will first locate each digital image on a geopolitical, topographical, etc., map and therewith calculate a route between these two digital image files 440. In some embodiments the route will follow existing streets and highways. In other embodiments, the path might be along rivers or other topographic or geographic features. In still other embodiments, the user will be allowed to select one or more waypoints that would indicate to the instant invention that a path other than the most direct one should be followed. In a next preferred step the user will select a transition theme from a plurality of supplied transition themes 450. Next, and preferably, the instant invention will insert the mapping route data into the selected transition theme, thereby generating the location-based transition 455. In a further step the generated transition will then be inserted into the multimedia work for viewing and approval by the user 460.

Turning next to FIG. 5, this Figure illustrates a high level workflow suitable for use with the instant invention. In a preferred first step, the instant invention will extract the GPS data from the selected digital files 500. In a next preferred step, mapping data will be generated, meaning that the extracted GPS data will be used to locate the associated digital media item 510. As further preferred step, the instant invention will generate mapping route data connecting both of the extracted GPS data 520 points and including, depending on the user's preference, a route that passes through one or more waypoints. In a next preferred step the user will select a transition theme 530 and, in the next step, the instant invention will insert the mapping route data into the transition theme 540. The geo-transition will then be generated and automatically inserted into the multimedia work between the two selected adjacent digital image files 550. In a further preferred step the multimedia work 560 will be generated, although in some embodiments the multimedia work will have already been generated and the geo-transition video will be inserted into an existing video work at a location between the starting and ending images. Additionally, in some embodiments the multimedia editing program will have a built-in ability to generate geo-transitions according to the instant methods and the step of generating the geo-transition might be performed during the generation of the rest of the multimedia video.

Finally, although the preferred location-based transitions might take many different forms, there are certain ones that are presently preferred by the instant inventors. In each of the examples that follow, it will be assumed that an image (or video, audio recording etc.) has been acquired at a first location (Image 1 at Location 1) and that it is followed in the multimedia work by an image (or video, audio recording, etc.) acquired at a second location (Image 2 at Location 2). As a first preferred example, the location-based transition might operate as follows: display (or play) Image 1, zoom out of (away from) Image 1 to reveal it as a dot on a map at Location 1 on the map, move the camera from Location 1 to Location 2 using the existing road system, and, then zoom in at Location 2 to reveal Image 2.

Continuing with the previous example, another variation might include displaying Image 1, replacing Image 1 with a geopolitical map that has Location 1 and Location 2 displayed thereon, traversing the map from Location 1 to Location 2 (e.g., by drawing a line in a highlighted color from Location 1 to Location 2 along existing streets or highways), and replacing the map which is now centered at Location 2 with Image 2.

In still another example, the displayed Image 1 might be replaced by the Google® Street View® at Location 1, and then displaying a series of Street View images that represent in some way the streets that would be traversed in driving from Location 1 to Location 2, and, finally, replacing the last Street View image (presumably, the Street View at Location 2) with Image 2.

As a final example, in still another variation given Location 1 and Location 2, the instant invention might ascertain and compile still images of all recognizable landmarks (e.g., public buildings, historical sites, tourist attractions, natural parks/wonders etc.) that might be encountered if the roads between Location 1 and Location 2 were driven. Then given this series of images, Image 1 would be replaced with the image series (preferably displayed in the order they would be encountered if the route were actually traversed), with Image 2 replacing the last of the landmark images. Obviously, this might be done in conjunction with a geopolitical (or topographic, etc.) map that could be used to mark the progress of the transition.

The transition theme would then preferably be user-selectable from any of the foregoing or any modifications thereof. For example, choice of a theme might also include choice of the map that is displayed. For example, in some instances a modern highway map might be desired as the background for the transition. In other instances, a topographic, topologic, hydrologic, contour, relief, or other map types might be used instead. In some instances it might be desirable to use, for example, an ancient map that has ocean monsters, demons, gods, mermaids, etc., (e.g., maps of the sort that were produced in the 1700s by the famous map makers De Witt, Blaeu, Speed, etc.).

Note that for purposes of the instant invention, the phrases "accessing routing data" or "determining routing data," etc., should be understood to mean determining a path between two known locations. This path might be along established roads, waterways, etc. ("map data"), or it might be a series of landmarks that are between the two locations ("landmark data"), or, more generally, it might be a series of waypoints selected by the user or selected automatically ("waypoint data"), or it might involve straight line, great circle, or other sorts of routing between the two locations.

Further, when the phrases "transition data" or "transition images" are used herein, those phrases should be broadly construed to mean a collection of images that are somehow representative of the routing data. As has been discussed previously, this might be a series of actual roadside or other images along established roads, successive images of an advancing colored line drawn on a map that advances from a first location to a second location, a transition from a first map image to a second map image (e.g., per FIG. 2), etc. The sorts of images that might be used will preferably be determined by the user's selection of a theme.

Still further, the term "transition video" should be understood to mean a video that begins with a selected starting image, transitions to a video that presents (with or without intermediate transitions) the transition images representative of the routing data and concludes with an ending image.

Finally, for purposes of the instant disclosure the term "geo-transition" will be understood to mean a video clip that has been created from routing data based on a user selected theme where the routing data is based on location data associated with a starting and an ending digital image.

Of course, it is anticipated that the instant geo-transition video will be inserted into, generated along with, or otherwise incorporated into a multimedia work that contains the starting and ending digital images and, potentially, additional images or videos. In an embodiment, by viewing the entire multimedia work (or at least the portion of the work that contains the starting and ending images and the transition) the viewer will be given the visual impression that the transition that was developed according to the instant invention to smoothly connect the starting and ending images. Further, those of ordinary skill in the art will recognize that any number of such geo-transitions might be inserted into a multimedia work. Additionally, the instant geo-transition method might be applied to video clips that have associated location data in many different ways. But, a preferred way of creating this transition is to use the last frame of the leading video clip as a first digital image and the starting frame of the following video as a second digital image. In other instances, the leading video clip will be allowed to end, a geo-transition inserted, and then the video clip that follows will be played. For purposes of the instant disclosure, when it is said that a digital image is selected it will be assumed, unless otherwise stated, that in the instance of video clips that will be the last frame of the leading clip and the first frame of the following clip.

CONCLUSIONS

Of course, many modifications and extensions could be made to the instant invention by those of ordinary skill in the art. For example, in one preferred embodiment a completely automatic form of the generation of a multimedia work is possible, wherein the user selects a plurality of digital image files, defines the display time of each digital image and initiates the generation process, that automatically extracts the GPS data from the digital images and generates location-based transition between each of the digital image files.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of performing a multimedia work, comprising the steps of:
    a. selecting a first digital image, said first digital image having a first location associated therewith;
    b. selecting a second digital image, said second digital image having a second location associated therewith;
    c. determining routing data between said first location and said second location, said routing data comprising a plurality of waypoints different from said first and second locations, at least one of said plurality of waypoints being proximate to a landmark;
    d. selecting a landmark image different from said first digital image and from said second digital image for each of said at least one waypoints proximate to said landmark;
    e. obtaining a selection of a theme;
    f. using at least said selected theme and said routing data to access a plurality of transition images, said plurality of transition images including all of said at least one landmark images;
    g. using at least said routing data and said accessed plurality of transition images to construct a transition video;
    h. generating said multimedia work using at least said first digital image, said second digital image, and said transition video; and,
    i. performing at least a portion of said multimedia work for a user, thereby performing at least a portion of said multimedia work.

2. The method according to claim 1,
    wherein step (a) comprises the steps of:
    (a1) selecting a first digital image,
    (a2) obtaining from a user a first location associated with said first digital image.

3. The method according to claim 1, wherein step (i) comprises the step of performing at least a portion of said multimedia work for a user by displaying said at least a portion of said multimedia work on a display device, thereby performing at least a portion of said multimedia work.

4. The method according to claim 1,
    wherein step (b) comprises the steps of:
    (b1) selecting a second digital image,
    (b2) obtaining from a user a second location associated with said second digital image.

5. The method according to claim 1, wherein said landmark is selected from the group consisting of a public building, a historical site, a tourist attraction, and a natural park.

6. A method of creating a multimedia work in a computer, comprising the steps of:
    within a computer,
    a. selecting a first digital image from within said multimedia work, said first digital image having at least a first location associated therewith;
    b. selecting a second digital image adjacent to said first digital image from within said multimedia work, said second digital having a second location associated therewith;
    c. determining routing data between said first location and said second location;
    d. receiving a selection of a theme said routing data comprising a plurality of waypoints different from said first and second location;
    e. using at least said received theme and said routing data to automatically select, without action of a user, a plurality of transition images, said transition images containing at least one landmark image proximate to one of said waypoints;
    f. using at least said accessed plurality of transition images to construct a transition video;
    g. incorporating said transition video into said multimedia work between said first digital image and said second digital image, thereby creating a modified multimedia work; and,
    h. performing at least a portion of said modified multimedia work containing said inserted transition video for the user, thereby performing at least a portion of said multimedia work.

7. The method according to claim 6,
    wherein step (a) comprises the steps of:
    (a1) selecting a first digital image from within said multimedia work,
    (a2) obtaining from a user a first location associated with said first digital image.

8. The method according to claim 6,
    wherein step (b) comprises the steps of:
    (b1) selecting a first digital image from within said multimedia work,
    (b2) obtaining from a user a first location associated with said first digital image.

9. The method according to claim 6, wherein each of said at least one landmarks is selected from the group consisting of a public building, a historical site, a tourist attraction, and a natural park.

10. A method of performing a multimedia work, comprising the steps of:

within a digital computer,
- a. receiving a selection of a first digital image, said first digital image having a first location associated therewith;
- b. receiving a selection of a second digital image, said second digital having a second location associated therewith;
- c. determining routing data between said first location and said second location, said routing data comprising a plurality of map data points corresponding to locations along map streets or highways defining a drivable route between said first location and said second location;
- d. receiving a selection of a theme;
- e. using at least said received theme and said routing data to access a plurality of transition images;
- f. using at least said routing data and said accessed plurality of transition images to construct a transition video, wherein said transition images are placed within said transition video in an order corresponding to a traversal of said map data points between said first and second location;
- g. generating said multimedia work using at least said first digital image, said second digital image, and said transition video; and,
- h. performing at least a portion of said multimedia work containing said transition video for a user.

11. The method according to claim 10, wherein at least one of said transition images corresponds to a landmark that is proximate to a point along said drivable route between said first image location and said second image location.

* * * * *